United States Patent [19]
Webb et al.

[11] Patent Number: 5,553,165
[45] Date of Patent: Sep. 3, 1996

[54] PARALLEL ERROR DIFFUSION METHOD AND APPARATUS

[75] Inventors: Michael Webb, Lane Cove; William C. Naylor, Jr., Mount Kuring, both of Australia

[73] Assignee: Canon, Inc., Tokyo, Japan

[21] Appl. No.: 177,306

[22] Filed: Jan. 4, 1994

[30] Foreign Application Priority Data

Jan. 11, 1993 [AU] Australia ................................ PL6763

[51] Int. Cl.⁶ ...................................................... G06K 9/36
[52] U.S. Cl. ........................ 382/252; 358/465; 382/234; 382/304
[58] Field of Search ................................ 382/50, 54, 51, 382/52, 53, 252, 270–273, 304, 234

[56] References Cited

U.S. PATENT DOCUMENTS

| | | | |
|---|---|---|---|
| 4,733,230 | 3/1988 | Kurihara et al. | 340/728 |
| 4,890,167 | 12/1989 | Nakazato et al. | 358/443 |
| 5,070,413 | 12/1991 | Sullivan et al. | 358/456 |
| 5,271,070 | 12/1993 | Truong et al. | 382/50 |
| 5,307,426 | 4/1994 | Kunno et al. | 380/50 |
| 5,325,448 | 6/1994 | Katuyama et al. | 380/50 |
| 5,351,312 | 9/1994 | Sato et al. | 380/50 |

FOREIGN PATENT DOCUMENTS 0272147  6/1988  European Pat. Off. .

OTHER PUBLICATIONS

P. Heckbert, "Color Image Quantization for Frame Buffer Display", Computer Graphics, vol. 16, No. 3, pp. 297–307 (Jul. 1982).
R. Ulichney, "Digital Half Toning", MIT Press, pp. 341, 342 (1987).
G. W. Braudaway, "Procedure for Optimum Choice of a Small Number of Colors From a Large Color Palette for Color Imaging", IBM Technical Disclosure Bulletin, vol. 29, No. 3, pp. 1329–1334 (Aug. 1986).

Primary Examiner—Joseph Mancuso
Attorney, Agent, or Firm—Fitzpatrick, Cella, Harper & Scinto

[57] ABSTRACT

In order to display continuous tone colour image on a discrete colour level display, methods of halftoning must be used. The high display rate of colour output devices means that serial methods of real time halftoning are difficult to use. A method and apparatus are disclosed for reducing the speed with which a halftoning method must be performed by performing the halftoning of an output image in parallel by simultaneously error diffusing more than one line of input at a time.

7 Claims, 11 Drawing Sheets

Fig. 8

PARALLEL ERROR DIFFUSION METHOD AND APPARATUS

FIELD OF INVENTION

The present invention relates to a colour display apparatus such as colour computer displays and colour printers, and, in particular, to the display of colour images on a raster colour display apparatus.

DESCRIPTION OF THE PRIOR ART

The prior art will now be described with reference to the following drawings in which:

FIG. 1 is view of a conventional single pixel of a CRT type display;

FIG. 2 is a representation of a normalized colour cube; and

FIG. 3 is a diagrammatic view of the Floyd and Steinberg error diffusion process.

Colour raster graphic display devices are well known in the art. The display of colour images in these devices is normally achieved by means of a pixel map. A pixel map normally consists of individual pixels with each pixel in turn consisting of a collection of bits which represent the colour value of that pixel on the display device. The number of different possible bits in this collection corresponds with the number of different colours which may be displayed by the display device and hence the resolution with which the device can display a given image. Common colour systems generally store 8 or 24 bits per pixel, although other variations are possible.

A display device displays the corresponding colour value of the pixel data input thereto, often to a high resolution. Common screen displays are capable of displaying a number of different pixels in the range of 1280×1024 pixels with each pixel capable of displaying generally up to $2^{24}$ different colour values.

Colours are often displayed on a computer display according to a particular model. The red, green, blue (RGB) colour model is one that is in common use with Cathode Ray Tubes (CRT) and colour raster display devices. Other colour display models include cyan, magenta, yellow (CMY) often used in colour-printing devices. An example of the use of the RGB model is in the NTSC picture display standard in common use with computer displays. In this standard, each pixel element is divided into 3 separate elements. These separate elements represent the Red, Green and Blue portion of a given pixel respectively.

As seen in FIG. 1, the viewing surface of a colour CRT often consists of closely spaced, pixels. Each pixel 20 is made up of a red (R), green(G) and blue (B) phosphor dot or pixel element 19. These dots are generally sized sufficiently small that light emanating from the individual dots is perceived by the viewer as a mixture of the corresponding three colours. A wide range of different colours can thus be produced by a given pixel by varying the strength with which each phosphor dot is excited. A conversion arrangement (not shown, but known in the art) is normally provided so that the strength of each phosphor dot's excitation has some proportionality to the value of each of the above mentioned pixel element subgrouping. By way of example, a 24 bit per pixel colour display system divided into 8 bits for each of the three colours red, green and blue can be assumed. This corresponds to $2^8$ or 256 separate intensity levels of each of red, green and blue respectively and therefore a total of $2^{24}$ different colour values. A colour display capable of displaying this many colours can approximate a continuous tone image to such a degree that for all practical purposes the display can be considered to be a continuous tone display.

In order to conceptualize the range of colours that can be printed by this method it is helpful to map these colours into a unit cube as shown in FIG. 2. The individual contributions of each of the 3 separate subgroups at any one particular point are added together to yield the final colour. For example, the main diagonal of the cube, with equal amounts of each primary, represents the different grey levels or grey scale, from black (0,0,0) to white (1,1,1)

Many display devices are unable to actually display the full range of colours provided by, for example, a 24 bit input pixel. For example, a black and white raster image display can only display two colours, namely black and white, and is known as a bi-level device. Other colour display devices can only display a finite number of discrete intensity levels for each primary colour. By way of further example, in a colour bi-level device, such as a bi-level ferroelectric liquid crystal display (FLCD), each pixel element on the screen can be at just two intensity levels, either fully on or fully off. If, for example, a display device can display bi-level red, green, blue and white primary colours the total number of different colours that each pixel can display will be $2^4=16$ different colours.

If the input to the display device assumes that there is a larger number of intensity levels then there will be an error in the colour displayed, with the error being the difference between the exact pixel value required to be displayed and the approximated value actually displayed. Methods have been developed to increase the perceived number of colours displayable on an discrete colour display device such as a bi-level colour display. The methods used are known generally as halftoning. For an explanation of the different aspects of halftoning the reader is referred to the book 'Digital Halftoning' by Robert Ulichney, published in 1991 by MIT Press.

One method described by Ulichney to improve the quality of a displayed image is called error diffusion. This process was developed by Floyd and Steinberg for a single colour (black or white) display and is described in "An Adaptive Algorithm for Spatial Gray Scale", Society for Information Display 1975 Symposium Digest of Technical Papers, 1975, 36. In the Floyd and Steinberg process, the error associated with each pixel value is added to the values of some of the neighbouring pixels of the given current pixel in such a manner that the sum of these additions is equal to the error associated with the pixel value. This has the effect of spreading, or diffusing, the error over several pixels in the final image to give an improved quality image. An example of this process is shown in FIG. 3. In this example a decision is made to spread the error associated with a current pixel 21, such that two eighths of the error is assigned to a pixel 22 on the right of the current pixel 21, one-eighths is assigned to its neighbour 23, two eighths is assigned to a pixel 24 below the current pixel 21 and one eighths is assigned to pixels marked 25, 26, 27 respectively.

High resolution displays in use commonly have pixel resolutions in the order of 1,280×1,024=1,310,720 pixels and a refresh rate in the order of 60 Hz. As mentioned previously, each pixel can have 24 bits associated with its colour value. It therefore follows that, if any processing of the pixels must be undertaken, then the high input rate of pixels would require this to be done at high speeds.

In the above example, a total capacity of over 235 mega bytes per second would have to be handled by a system wishing to process the display input data. Error diffusion is an example of a process which requires high processing rates, as each pixel must be looked at and the errors diffused to neighbouring pixels. Additionally, the error diffusion process is difficult to implement in any other than a serial manner as the error diffusion of one pixel element will influence all subsequent elements that are to be processed.

By the choice of neighbouring pixels that are below or too the right of a current pixel in a rasterized image, the error diffusion can be achieved by one top-to-bottom pass over the image, as the errors diffused from a current pixel can then only influence subsequent pixels.

SUMMARY OF THE INVENTION

It is an object of the present invention to provide a means for reducing the speed with which the error diffusion process must be carried out through the provision of multiple error diffusion process simultaneous error diffusing different portions of the image.

In accordance with one aspect of the present invention, there is provided a method of reducing the rate at which an image formed by input pixels is error diffused, said method comprising the steps of:
- (a) dividing the input pixels to be error diffused into at least two groups;
- (b) with a first one of the groups, performing a first series of steps comprising:
  - (i) receiving the first group of input pixels and combining same with a first group of previously calculated error diffusion data from neighbouring pixels to produce a first group of input corrected pixels;
  - (ii) determining for each said input corrected pixel of said first group a first display output value and associated error diffusion value to obtain a first group of display output data and a first group of error diffusion data,
- (c) simultaneously, with a second one of said groups of input pixels, performing a second series of steps comprising:
  - (iii) error diffusing a second group of previously calculated input corrected pixels to obtain a second group of error diffusion data and a second group of display output data;
  - (iv) receiving the second group of input pixels and combining said second group of input pixels with said second group of error diffusion data to obtain a second group of input corrected pixels; and
  - (v) storing the second group of input corrected pixels in a storage means.

In accordance with another aspect of the present invention, there is provided a parallel error diffusion apparatus for use with a display device, said apparatus comprising:
- input correction means for receiving input pixels for display and to receive error data, and configured to combine said error data and said input pixels to produce corrected input pixels;
- first and second error diffusion means adapted to receive said input corrected pixels to determine display data and associated error data therefrom;
- line store means adapted to store at least one line of display input pixels and to receive said error data from said error diffusion means;
- display data storage means for storing one line of said display data; and
- an output sequencer for retrieving said display data from said display storage means and outputting same for display.

BRIEF DESCRIPTION OF THE DRAWINGS

A number of preferred embodiments of the present invention will now be described with reference to the accompanying drawings in which:

FIG. 8 is a schematic view of the operation of an alternative embodiment of the present invention;

DESCRIPTION OF THE PREFERRED AND OTHER EMBODIMENTS

In the present embodiment, a real time error diffusion process is achieved by parallelizing the error diffusion process so that there are a multitude of error diffusion processes which are able to work on the overall error diffusion process simultaneously, thereby reducing the speed requirements with which an input image must be handled.

As mentioned previously, FIG. 3 shows the normal Floyd and Steinberg error diffusion process operating on one line of the input image. In this process, the current pixel 21, which is thresholded according to the error diffusion process to be used and an output colour O, is obtained in addition to an error measure for distribution to adjacent pixels. This error is added to the value of adjacent pixels 22,23,24,25, 26,27 in the nature as shown. As a result of this process the values of these pixels are changed.

Subsequently, the error diffusion process continues along the current line and the pixel 22, is used for the process of error diffusion, followed by pixel 23 and so forth. At the start and end of a line, the error values which would be diffused to non-existent elements are most often discarded.

Figure 4:
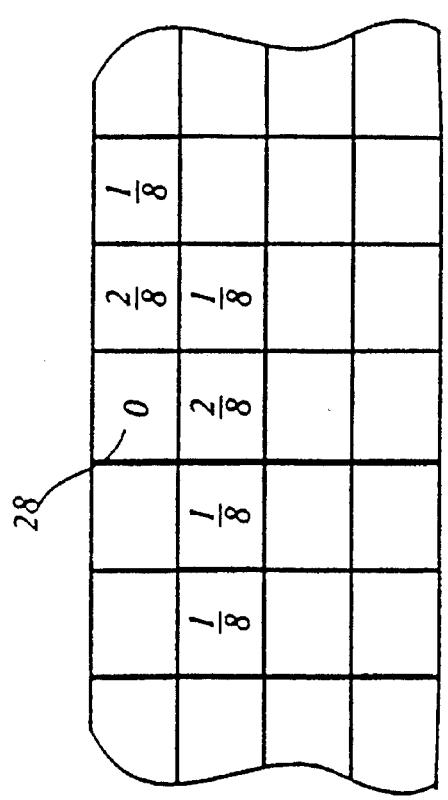
FIG. 4 is an illustration of the operation of the preferred embodiment of the present invention.
Figure 4:
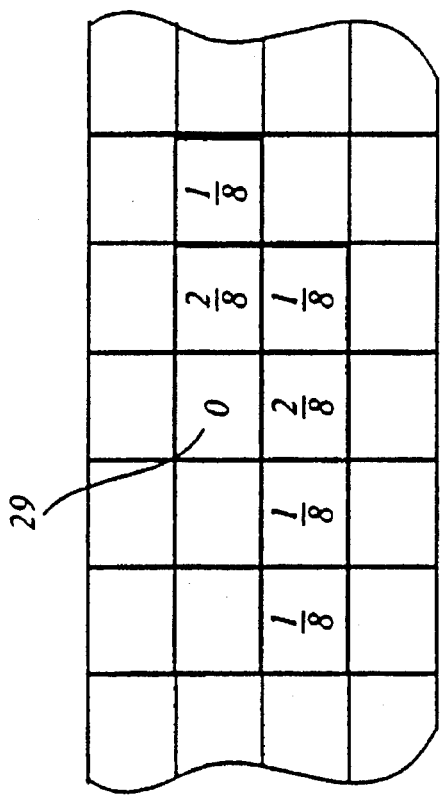

Referring now to FIG. 4, in the preferred embodiment, a first and second error diffusion unit 28, 29 respectively operate on different portions of the input data simultaneously. In this process, a first error diffusion process 28, error diffuses the input pixels on the nth line of the input while a second error diffusion unit 29 simultaneously error diffuses information on the (n+1)th line. Error diffusion process 29, preferably is timed to stay far enough behind the first error diffusion unit 28 that no two error diffusion processes are required to write to the same pixel cell at the same time and hence the need for complex interlocking is avoided.

Figure 5:
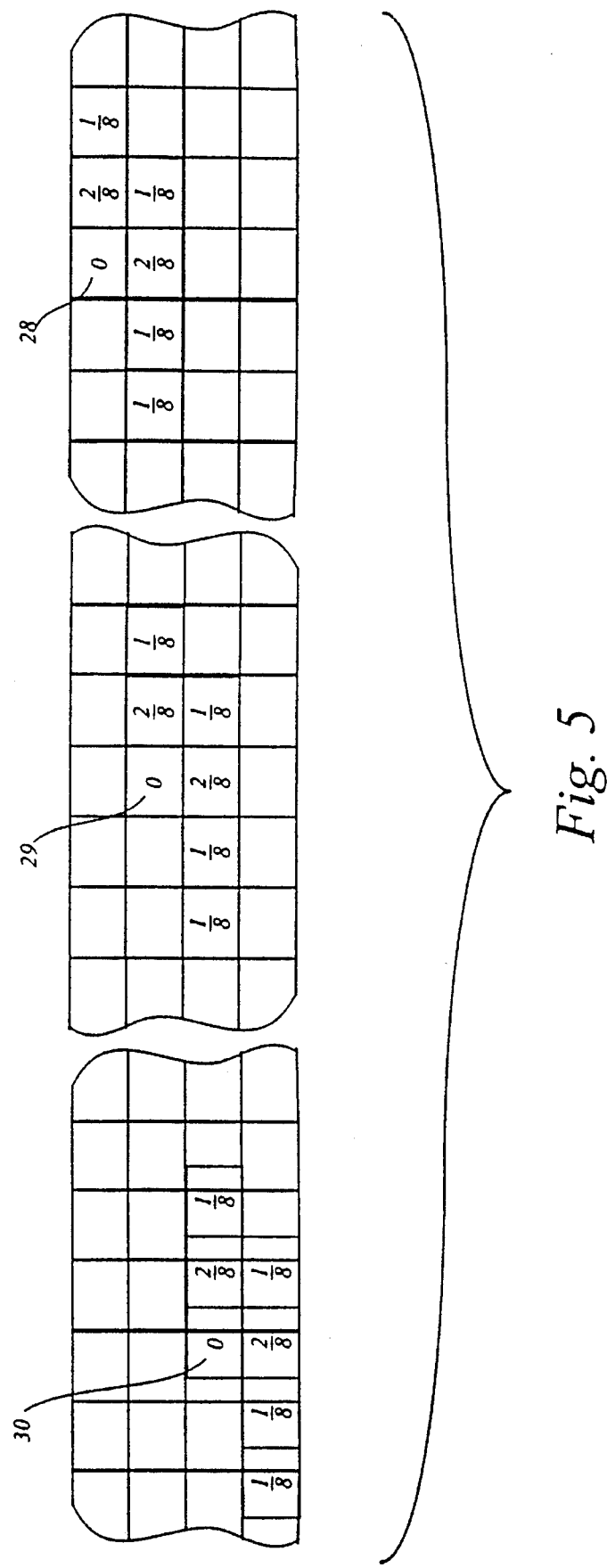
FIG. 5 is an illustration of an alternative embodiment of the present invention.

Referring now to FIG. 5, the error diffusion of the input image can be further made parallel by the inclusion of further error diffusion processes, for example, a third error diffusion process 30, operates simultaneously on the (n+2)th line of input data.

The method used to produce the error diffusion value is a three-dimensional full colour error diffusion process as set out in 'Colour Image Quantization for Frame Buffer Display' by Paul Heckbert, published in Computer Graphics, Volume 16, Number 3, July 1982, pages 297–304.

In the Heckbert process, the different possible output values of the display are chosen as the representative colours of the colour gamut of displayable images. A vector measure in a 3-dimensional colour space representing the distance between the nearest displayable colour value and a current input colour value is computed and this value is then preferably added to neighbouring pixels using the Floyd and Steinberg process.

Figure 6:
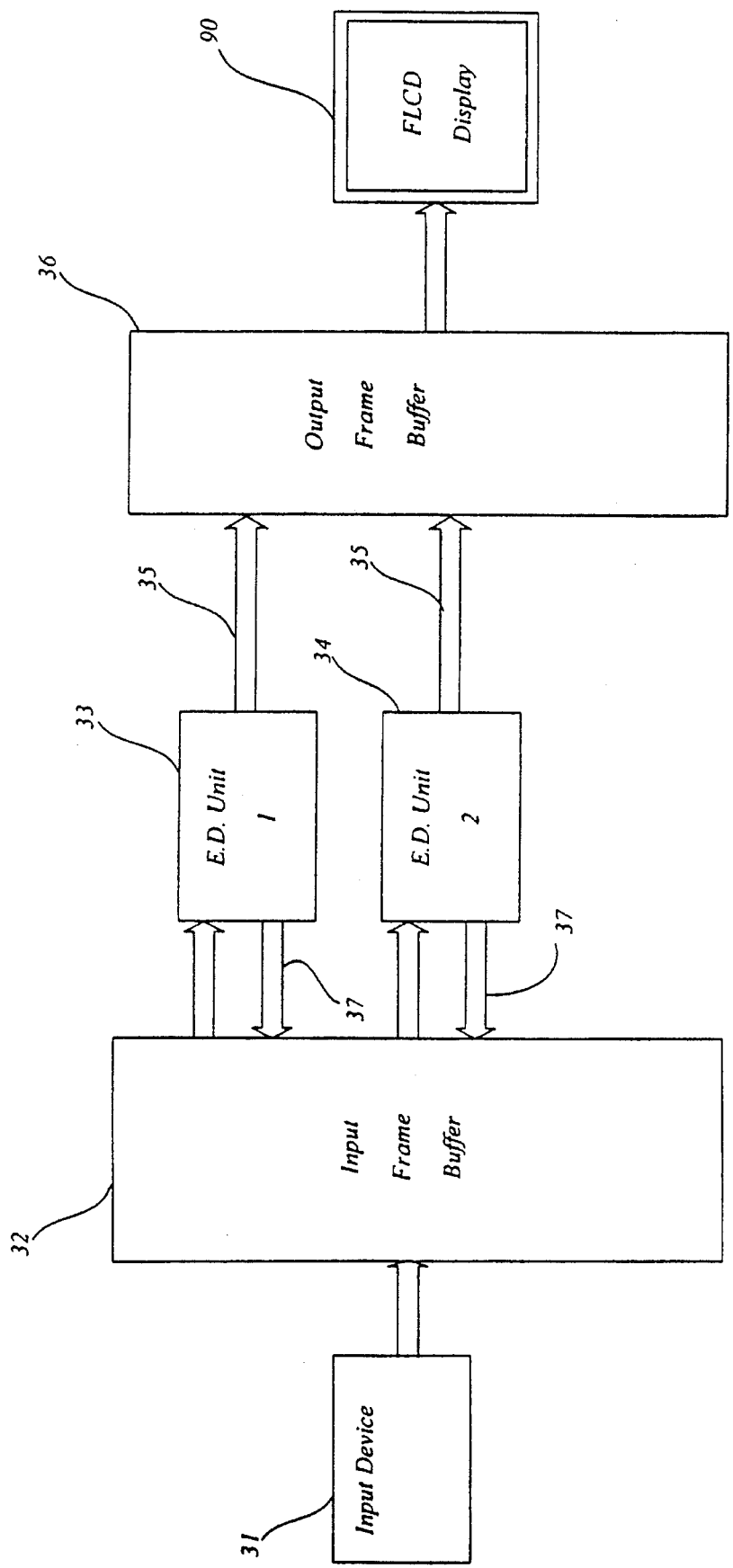
FIG. 6 is a generalised block diagram of an apparatus incorporating the preferred embodiment.

Referring now to FIG. 6, showing a first example of operation of a parallel error diffusion apparatus of the preferred embodiment. An input device 31 inputs 24-bit pixels into an input frame buffer 32, which is capable of storing the input pixels on a line by line basis. Two error diffusion units 33,34 read pixels from the input frame buffer and output error diffused values 35, to an output frame buffer 36, for displaying on an FLCD output device 90. In addition to clearing the current value of the pixel of the input frame buffer 32, the error diffused values are added to the neighbouring pixels of the current pixel, via two buses 37.

The error diffusion units 33,34 operate in parallel as mentioned previously. By means of this parallel processing, the error diffusion units are able to work at a slower rate than the rate at which the input device is inputting values into the frame store.

Figure 7:
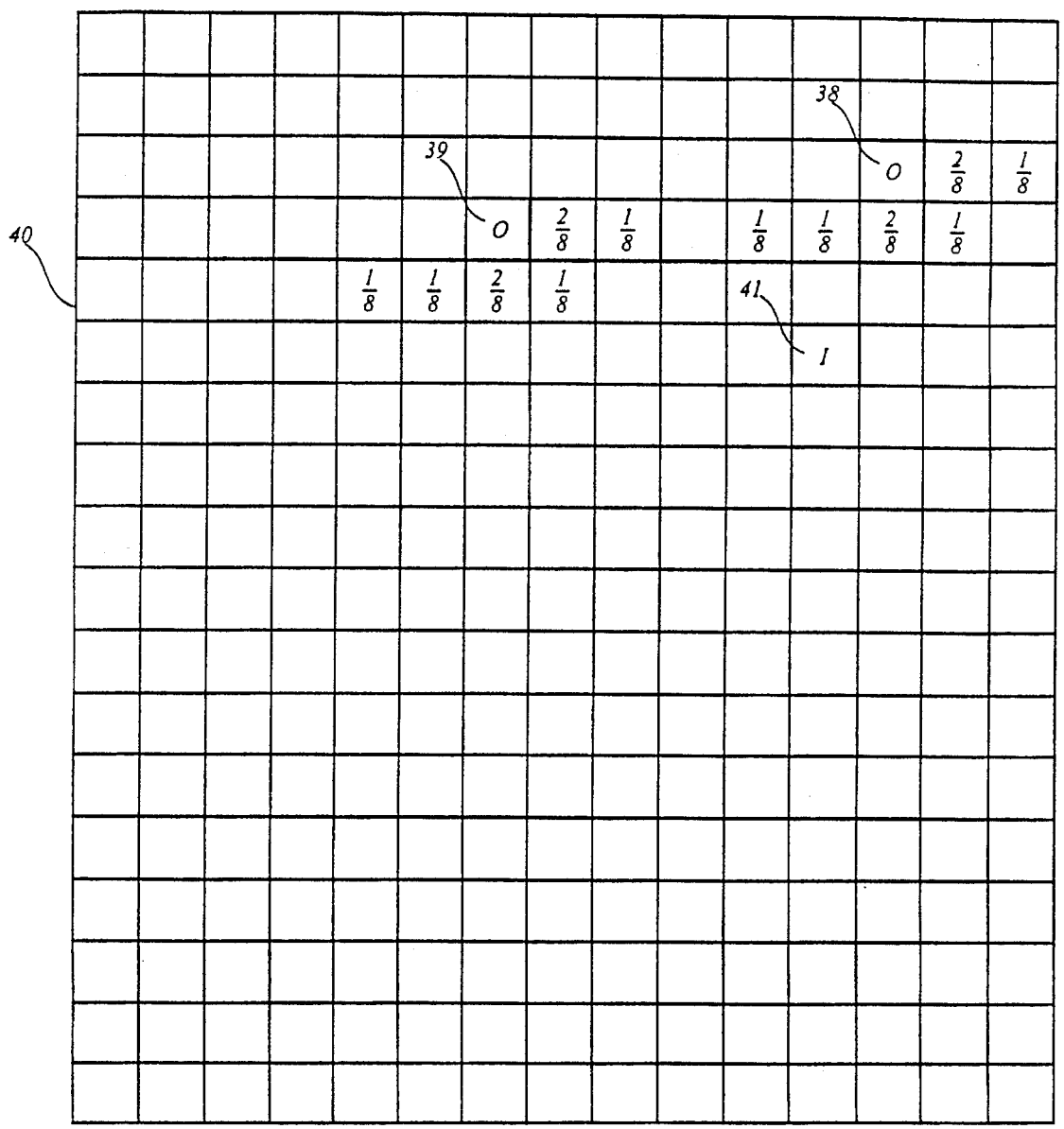
FIG. 7 is a schematic view of the operation of the preferred embodiment.

Referring now to FIG. 7, by way of example, shows one state of a simplified 18×15 frame buffer during operation of the preferred embodiment. The input device 31, is inputting pixels 41 into the input frame buffer 32 at a high rate. The error diffusion processes 38, 39, are error diffusing previous lines of the input data at a speed approximately half that which the input device 31, is inputting data. When the error diffusion process 38, finishes with its current line, it will immediately begin on the next line 40 requiring error diffusion. The overall effect of the two error diffusion processes is the same as that of a single error diffusion process operating at a higher speed approximately equivalent to the input device 31.

Figure 8:
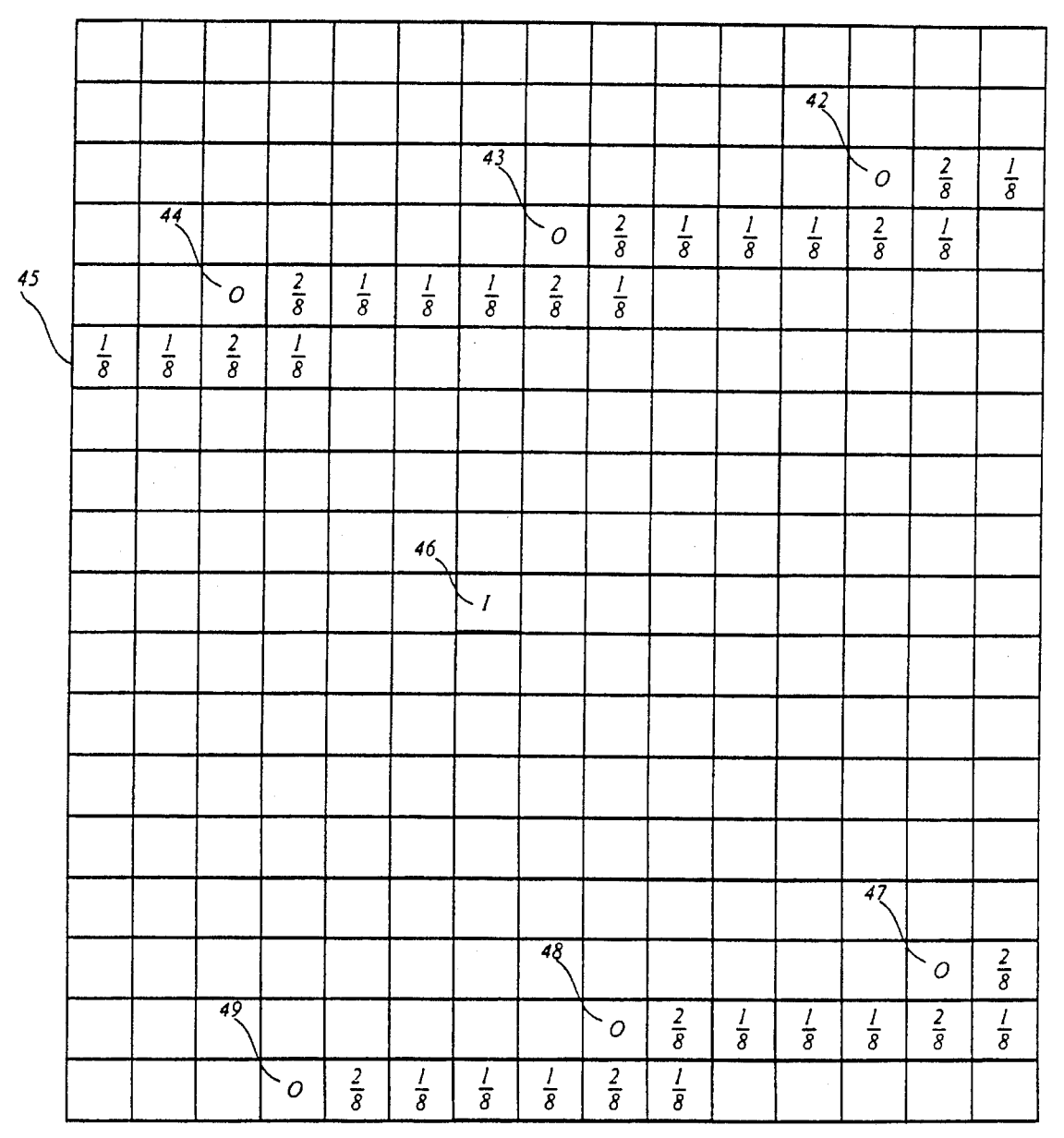

In a further embodiment, depicted in FIG. 8, further parallelization of the error diffusion process is achieved by error diffusion processes 42,43,44 error diffusing the current input screen. When the error diffusion process 42 finishes with its current line, it will immediately begin on the next line 45 requiring error diffusion. The input device is inputting values into the frame buffer 46 at a higher rate than the error diffusion processes can maintain. Once the input device has completed the last line, it starts again on the first line. Although the error diffusion units 47,48,49 are still working on the previous image of input values, they are able to keep far enough ahead of the input device that they complete the processing of the previous screen of input values before the input device is required to write to the same pixel value. The output values '0' are written to an output frame buffer 36 as they are produced by the error diffusion units and are later read out to the Output Display 31, as required.

As can be seen from the above description, the use of multiple staged error diffusion processes allows the error diffusion process to be carried out in parallel while still being able to keep up with a high input data rate which may be required. The preferred embodiment is particularly useful with RGB colour systems and has particular application to a Red, Green, Blue, White (RGBW) ferro-electric liquid crystal display devices an application of which will now be described.

In this further embodiment, a real time error diffusion process is achieved by parallelizing the error diffusion process so that there are two units working on the error diffusion process at the same time. Hence each unit is able to work at half the data rate than that which would normally be required. Additionally, by careful and flexible use of memory, only the equivalent of a single line store is needed for temporary storage of input pixels and an optional single line store is used for the temporary storage of output pixels. By use of such storage means and parallel error diffusion units, incoming pixel values can be processed at half the speed than would normally be required and storage requirements are substantially reduced.

In this particular embodiment, input data is assumed to be received in the form of two 24-bit samples each cycle. The output device is also assumed to have 4 colours, Red, Green, Blue, White (RGBW), each able to display 2 levels of colour (on or off). Hence the output values to be sent to the display are conveniently in the form of 4-bits with one bit for each relevant colour.

Figure 9:
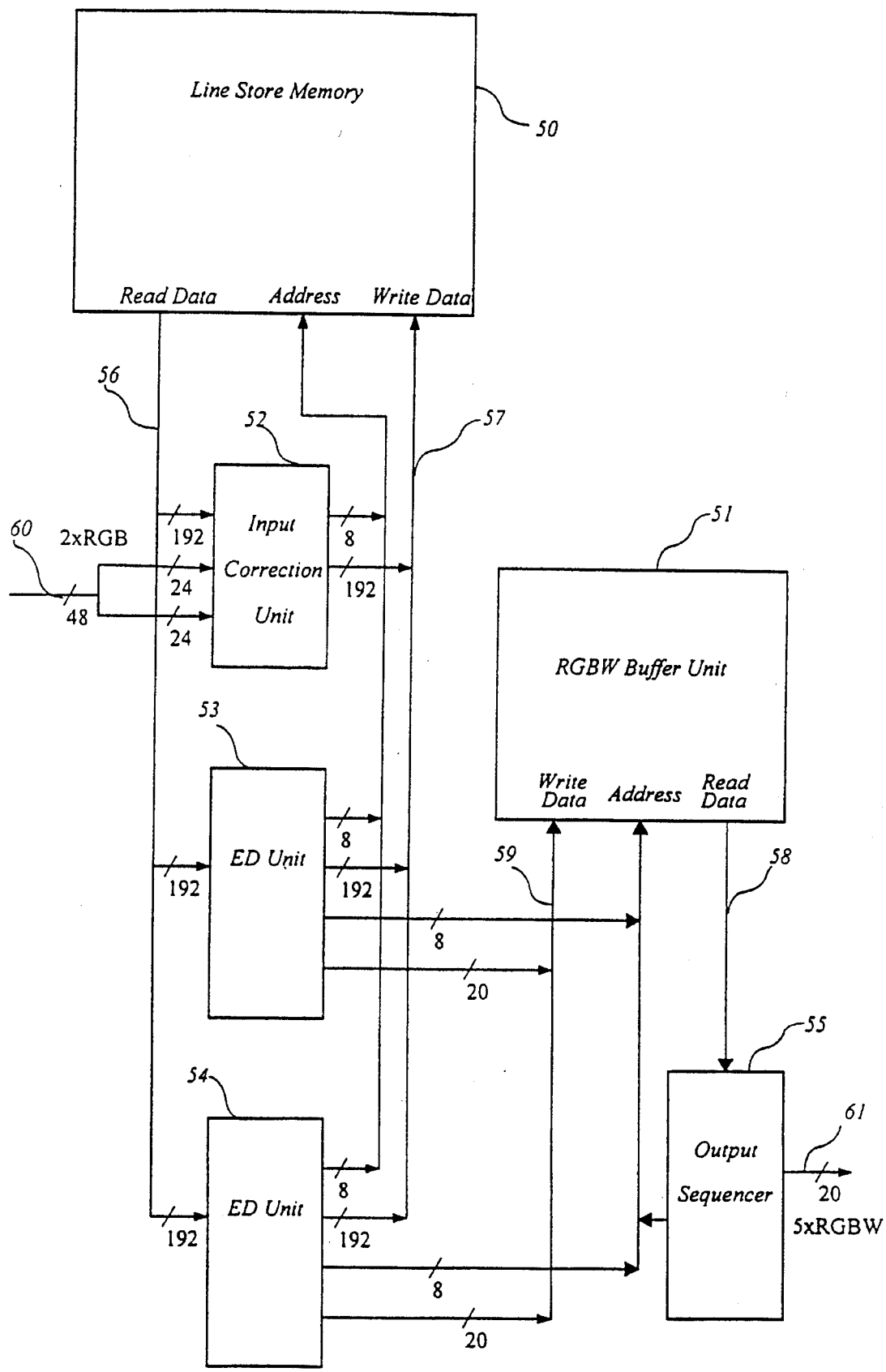
FIG. 9 is a schematic block diagram representation of an apparatus incorporating the preferred embodiment.

Turning now to FIG. 9, the overall structure of the Parallel Error Diffusion Device is shown, and consists of a Line Store Memory 50, a Red Green Blue White (RGBW) Buffer Unit 51, an Input Correction Unit 52, Error Diffusion Units 53, 54 and a Output Sequencer 55. The Line Store Memory 50, is capable of storing a complete line of pixels for the display, and in this particular embodiment, the memory 50 is capable of storing 1280×24=30720 bits, representing 1280 pixels on a line by 24 bits per pixel. The Line Store Memory 50 is configured such that it can be read from, or written to, once each cycle. A Read Data Bus 56 and a Write Data Bus 57, are each capable of reading or writing 192 bits (i.e. 8 pixels) of data during any one cycle.

The RGBW buffer unit 51, can also be read or written once each cycle, and is arranged as a 1280 pixel by 4 bit RGBW buffer, and has write data 58 and read data 59 buses which are both 20 bits wide.

The two identical Error Diffusion units 53,54 are capable of taking information from the Line Store Memory 50 and each produce two outputs. The first output is in the form of 4-bits per pixel RGBW data, which is fed to the RGBW Buffer Unit 51 and the second output is 24-bit per pixel error data, which is written back to the line store.

The Input Correction Unit 52 receives an input bus 60 in the standard RGB format consisting of 8 bits of Green, Red and Blue input levels respectively. The input bus 60, contains two sets of pixel data at a time and therefore is 2×24=48 bits wide. As will be explained further below, the Input Correction Unit 52, combines the RGB input data with error data for that pixel which is contained in the Line Store Memory 50, generating corrected RGB data to be written back to the Line Store Memory 50.

The Output Sequencer 55, is responsible for reading data out of the RGBW Buffer Unit 51, and for driving an RGBW display (not shown, but known in the art) in the correct sequence by buffering the data and outputting same on the Output Bus 61. Because the input rate is 2 pixels per cycle, in order to maintain the output rate at the same rate, the Output Sequencer 55 reads output data out of the RGBW Buffer Unit 51 at the rate of five 4-bit samples every 2.5 cycles (i.e. two 20-bit reads every five cycles), and latches and buffers the data before driving it on the Output Bus 61 at the required rate.

Figure 10:
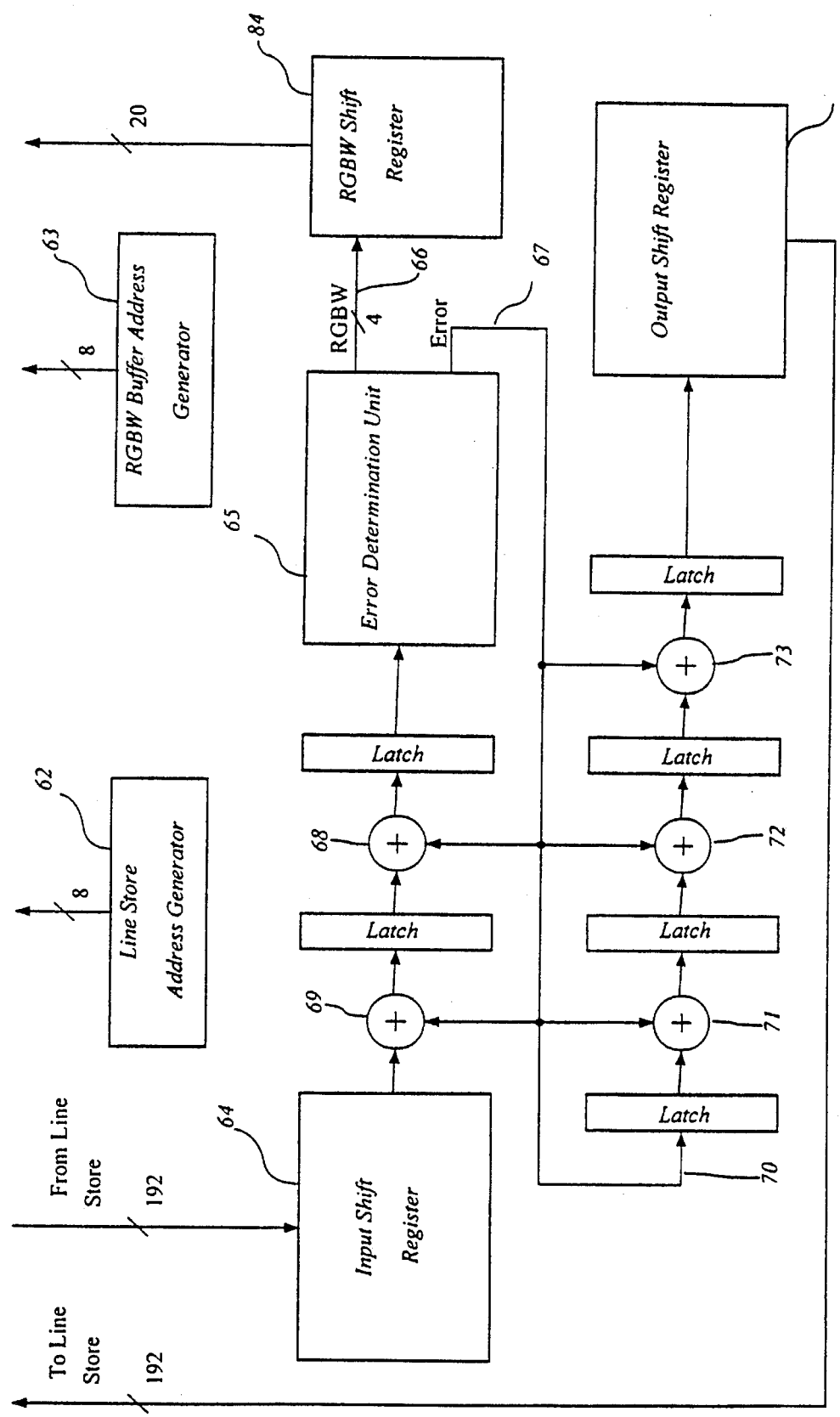
FIG. 10 is a schematic block diagram of the Error Diffusion Unit of FIG. 9.

Referring now to FIG. 10, the operation of the substantially identical Error Diffusion Units 53,54 will now be explained in more detail. The Error Diffusion Units 53,54 each contain two Address Generators 62,63 for sequencing 192-bit (8×24 bit RGB pixel groups) wide data from the Line Store Memory 50 and 20 bit (5×4 bit RGBW) output data to the RGBW Buffer Unit 51. Data is sequenced through the Error Diffusion Units 53,54 in line pixel order. The 192 bit wide corrected input data is shifted by an 8-stage shift register 64 which resequences the data into 24-bit form.

An Error Determination Unit 65 takes 24 bit input data in a RGB format and produces output data in the form of 4-bit RGBW data 66 forwarded to an RBGW Shift Register 84, and 24-bit RGB correction error data 67 by preferably determining which output colour pixel is the closest to the input data and determining a vector distance between the output RGBW data and the RGB input data. This error information is written back to the next line of the Line Store Memory 50 as will be better described.

Figure 1:
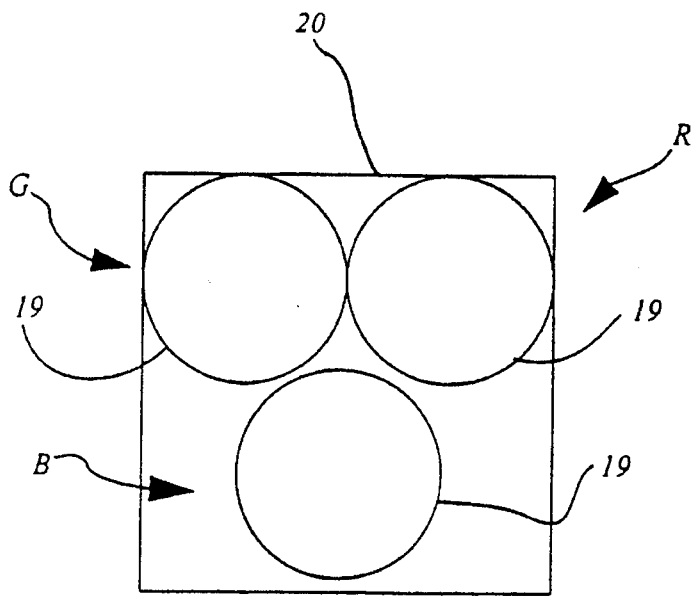
FIG. 1 is a view of a conventional single pixel of a CRT type display.
Figure 2:
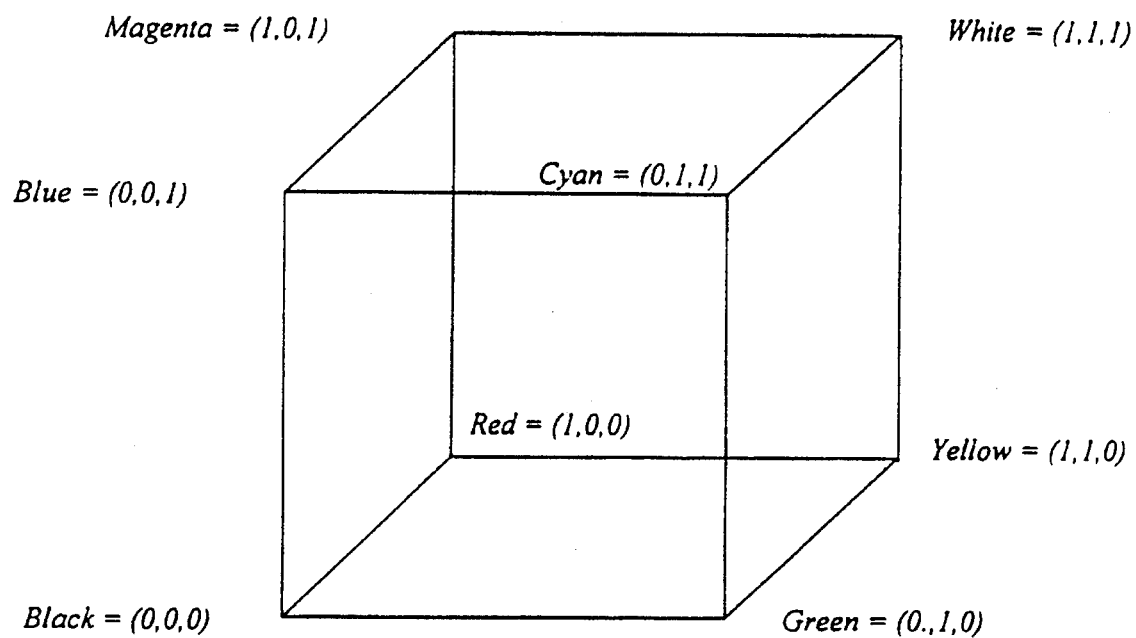
FIG. 2 is a representation of a normalized colour cube.
Figure 3:
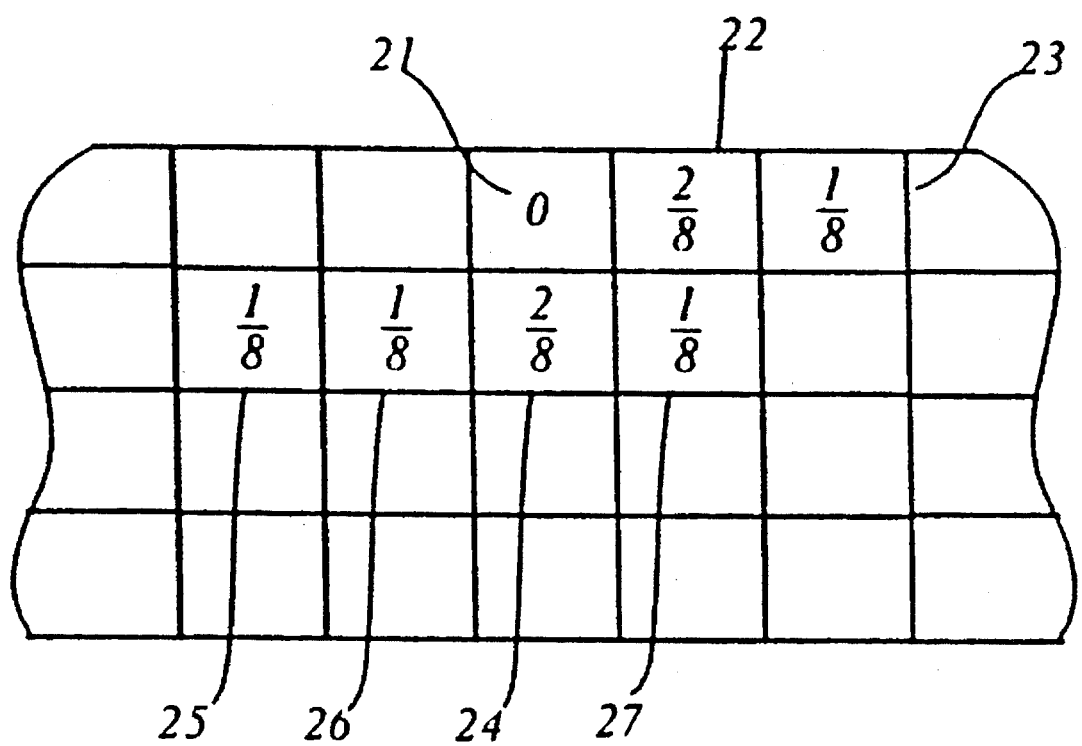
FIG. 3 is a diagrammatic view of the Floyd and Steinberg error diffusion process.

The resultant error data is diffused into the neighbouring pixels according to the scheme outlined previously and depicted in FIG. 3. This resultant error is output on the error bus 67. An adder 68, which consists of three 8 bit adders that add two eighths of the error to the next pixel of the input stream, is provided. Similarly, an adder 69 takes one eighth of the value of the error result and adds this to the pixel value corresponding to 23 in FIG. 3.

Similarly, the error information is added to the next line of the Line Store Memory 50 by adding the portions of the error result being one eighth at 70, one eighth at 71, two eighths at 72 and one eighth at 73. This corresponds to adding the portion of error information shown at 25,26,24, 27 of FIG. 3. The errors from each other pixel is also accumulated in this 4-stage pipeline, which produces the total error to be added in each pixel position on the next line. These accumulated error values are written back into the Line Store Memory 50 via an Output Shift Register 74, to be accessed in the following line by the Input Correction Unit 52. The RGBW values are written to the RGBW Buffer Unit 51 via an RGBW shift register 84.

Figure 11:
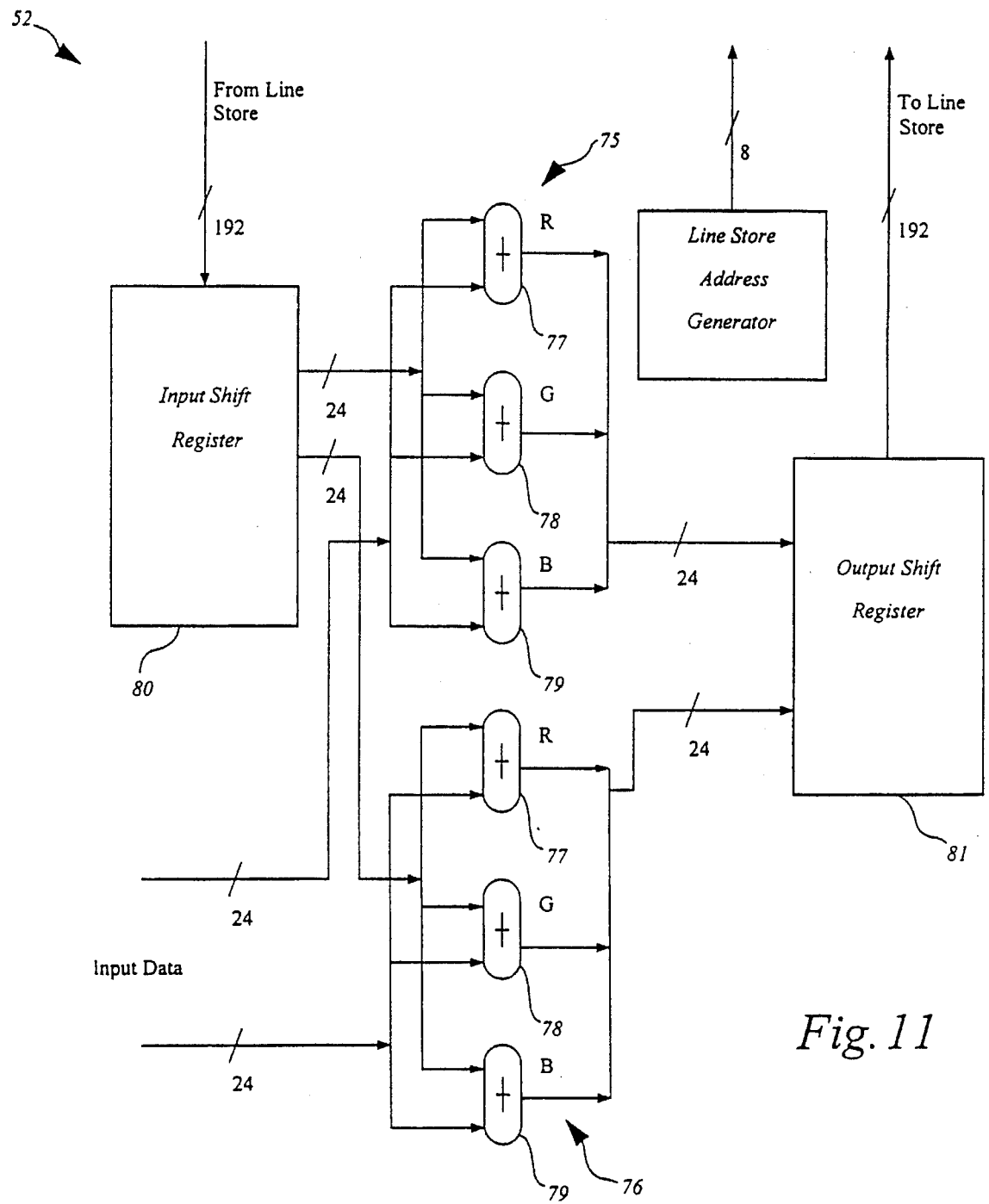
FIG. 11 is a schematic block diagram representation of the Input Correction Unit of FIG. 9.

Referring now to FIG. 11, there is shown the Input Correction Unit 52 which corrects incoming RGB data for each pixel by adding the error values diffused from the previous line. The resulting corrected input values are stored-back into the Line Store Memory 50. The correction of input values before they are stored in the Line Store Memory 50 avoids the requirement for separate line stores for input and error values. The Input Correction Unit 52 consists of two sets of Correction Units 75,76 which each consisting of three adders 77,78,79, one for each of the RGB values. Input and Output Shift Registers 80,81 (respectively) are provided to sequence the data to and from the Line Store Memory 50. The Input Correction Unit 52 works on two RGB values per clock cycle in order to correct input data at the rate at which it is input. It has twice the bandwidth requirement of the Error Diffusion Units 53,54, both for reading and writing the Line Store Memory 50.

Figure 12:
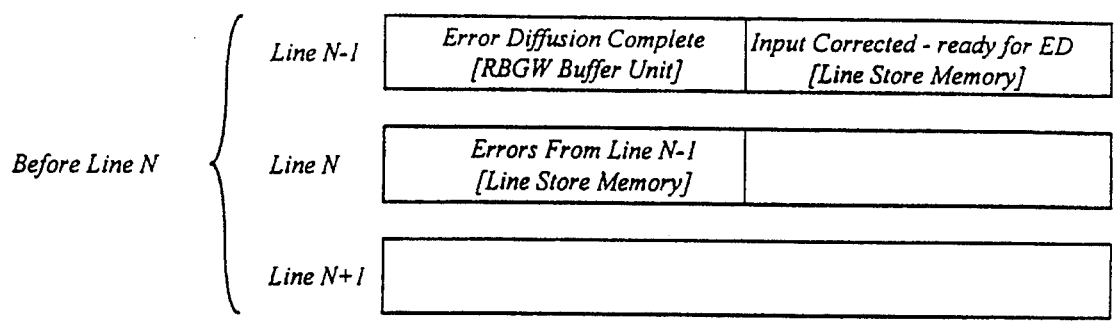
FIG. 12 is a schematic view of an initial state of the apparatus of FIG. 9.
Figure 13:
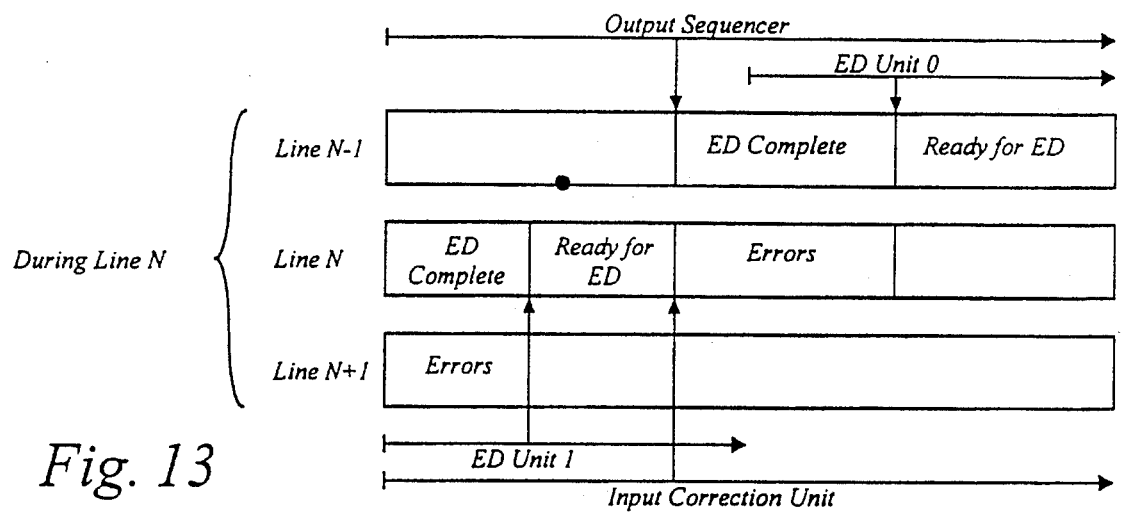
FIG. 13 is a schematic view of a further second state of the apparatus of FIG. 9.
Figure 14:
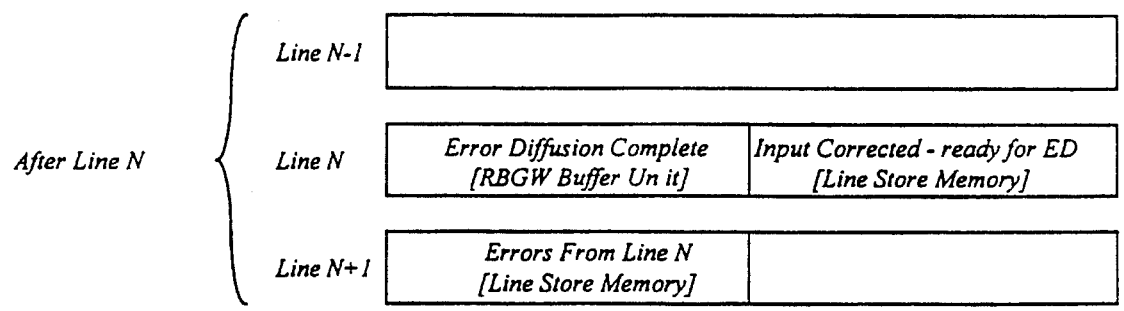
FIG. 14 is a schematic view of a further third state of the apparatus of FIG. 9.

Referring now to FIGS. 12, 13, 14, in order to better understand the operation of the Parallel Error Diffusion Device of FIG. 9, an example operation will now be described.

FIG. 12 shows the state of the error diffusion processing before the start of line N. The first half of the previous line (line N−1) has been error diffused; the results from this are in the RGBW buffer 51. The second half of line N−1 has been input corrected, and is ready for error diffusion. This data is stored in one half of the line store memory 50. The other half of the line store is occupied by the error values diffused from the first half of line N−1 into the first half of line N (the line about to be processed).

When the Parallel Error Diffusion Device starts processing line N, four operations are started almost in parallel. The time taken for one line to be processed is conveniently termed a line time. Data from some operations is reused by other operations within the same line time, so the commencement of the operations is staggered slightly (by a few clock cycles). The horizontal blanking time (time between lines when no data is input to the Parallel Error Diffusion Device) allows the extra clock cycles required to stagger the operations and still have them complete within a single line time. FIG. 13 shows the state of the Line Store Memory 50 and RGBW Buffer Unit 51, part of the way through the line, and indicates the current working position within the Line Store Memory 50 and RGBW Buffer Unit 51 of each of the Error Diffusion Units 53,54.

The first operation occurring during line N is the error diffusion of the second half of line N−1, which is done by Error Diffusion Unit 53. Previously input corrected values are read out of the line store into the Error Diffusion Unit 53. The RGBW results from the error diffusion are written into the RGBW Buffer Unit 51. Error data diffused into the second half of line N is written back to the Line Store Memory 50.

The second operation during line N is the reading of the RGBW values for line N−1 by the Output Sequencer 55. At the start of line N, the RGBW values for the first half of line N−1 are in the RGBW Buffer Unit 51. The Output Sequencer 55 reads these values at the rate of two values per clock cycle, so that by the end of the line all of the RGBW values for line N−1 have been output. It is necessary to ensure that the error diffusion of the second half of line N−1, which is proceeding in parallel, always stays far enough ahead of the Output Sequencer 55, so that the last RGBW values for the line are written into the RGBW Buffer Unit 51 before the time at which the Output Sequencer 55 reads the end values of the line. This is accomplished by staggering the starting time of the Output Sequencer Unit 55 relative to the RGBW Buffer Unit 51 by a few clock cycles.

The third operation on line N is the input correction of the incoming line N data. The Input Correction Unit starts at the beginning of the line, reading error values from the line store at the rate of two per cycle, adding them to the incoming data, and writing two corrected inputs back into the line store in each cycle. The entire line is input corrected at the rate at which it comes into the Input Correction Unit. As seen in FIG. 12, the error values from line N−1 required for the correction are in place for the first half of line N before the operation starts; the remaining error values are being generated by Error Diffusion Unit 1 53 as the line proceeds. Again, it is necessary to ensure that the Error Diffusion Unit 1 53 always produces the error values in advance of the time they are required by the Input Correction Unit 52.

The fourth operation that takes place during line N is the error diffusion of the first half of line N. This works from the beginning of the line, and is timed to start immediately after the input correction has corrected the first pixel input. This error diffusion is done in Error Diffusion Unit 54. RGBW data produced is written into the RGBW Buffer Unit 51, behind the position where the output sequence is reading. Errors to be diffused to the next line are written back into the Line Store Memory 50.

FIG. 14 shows that at the end of the line, the contents on the Line Store Memory 50, are in the same configuration as they were at the start of the line with the overall side effect of error diffusion of one line having occurred.

FIGS. 12 to 14 show that the four operations can proceed in parallel with only one Line Store Memory 50 location for each pixel position in the line. Each Line Store Memory 50 location is read twice and written twice for each line; each RGBW Buffer Unit 51 location is written and read once for each line. The locations of Line Store Memory 50 in the second half of the line are first read by Error Diffusion Unit 53, and the error values for the next line written back. These error values are subsequently read by the Input Correction Unit 52, and the corrected input written back to the same location. Locations in the first half of the line are accessed in the opposite order, that is a read and a write for the Input Correction Unit 52, followed by a read and a write for the Error Diffusion Unit 54.

The two Error Diffusion Units 53, 54, Input Correction Unit 52, and Output Sequencer 55 read and write the data in the Line Store Memory 50 and the RGBW Buffer Unit 51 to match the input and output requirements to successfully error diffuse the input image. As mentioned previously, the half-speed Error Diffusion Units 53,54 individually take two line periods to complete the error diffusion calculation for a line. In each line period, each Error Diffusion Unit 53,54 calculates the error diffusion results for half of one line, the Input Correction Unit 52 corrects and stores the data for an entire line, and the Output Sequencer 55 writes out an entire line of RGBW data.

The foregoing describes only a number of embodiments of the present invention particular to the RGB model for use with a RGBW ferro-electric liquid crystal display, use of other models and modifications, obvious to those skilled in the art, can be made thereto without parting from the scope of the invention.

We claim:

1. A method of reducing the rate at which an image formed by input pixels is error diffused, said image comprising at least one line of input pixels, said method comprising the steps of:

(a) dividing the input pixels to be error diffused into at least two groups, said groups comprising different portions of the same at least one line of said image;

(b) with a first one of the groups, performing a first series of sub-steps comprising:

(b1) receiving the first group of input pixels and combining the first group of input pixels with a first group of previously calculated error diffusion data from neighbouring pixels to produce a first group of input corrected pixels;

(b2) determining for each input corrected pixel of the first group a first display output value and associated error diffusion value to obtain a first group of display output data and a first group of error diffusion data, (b3) storing the first group of error diffusion data in a first storage means, (c) simultaneously with step (b), with a second one of the groups of input pixels, performing a second series of sub-steps comprising:

(c1) error diffusing a second group of previously calculated input corrected pixels to obtain a second group of error diffusion data and a second group of display output data;

(c2) receiving the second group of input pixels and combining the second group of input pixels with the second group of error diffusion data to obtain a second group of input corrected pixels; and (c3) storing the second group of input corrected pixels in a storage means.

2. A method as claimed in claim 1, further comprising the step of storing the first group of display output data and the second group of display output data.

3. A method as claimed in claim 2, further comprising the step of outputing the display output data in a predetermined order.

4. A method as claimed in claim 1, further comprising the step of storing the second group of error diffusion data in the storage means along with the second group of input corrected pixels.

5. A method as claimed in claim 1, further comprising the sequential step of repeating step (a) followed by steps (b) and (c) simultaneously, wherein for each repetition, the first group of error diffusion data stored at step (b3) is used at the next repetition of step (b1), and the second group of input corrected pixels stored at step (c3) is used at the next repetition of step (c1).

6. An error diffusion apparatus for use with a display device, said apparatus comprising:

input correction means for receiving input pixels for display and to receive error data, and configured to combine said error data and said input pixels to produce corrected input pixels;

first and second error diffusion means for operating on the same one or more consecutive lines of image data simultaneously and receiving said input corrected pixels to determine display data and associated error data therefrom;

line store means adapted to store at least one line of the corrected input pixels and to receive said error data from said error diffusion means;

display data storage means for storing one line of said display data; and an output sequencer for retrieving said display data from said display storage means and outputting same for display.

7. Apparatus as claimed in claim 6, wherein said first and second error diffusion means comprises a pipelined arrangement for determining said error data and said display data.

* * * * *

UNITED STATES PATENT AND TRADEMARK OFFICE
CERTIFICATE OF CORRECTION

PATENT NO. : 5,553,165
DATED : September 3, 1996
INVENTOR(S) : Webb et al.

It is certified that error appears in the above-indentified patent and that said Letters Patent is hereby corrected as shown below:

Title page, item
[75] INVENTORS:

"Mount Kuring" should read --Mount Kuring-gai--.

Drawing:
SHEET 11:

FIG. 14, "Un it]" should read --Unit]--.

COLUMN 10:

Line 27, "outputing" should read --outputting--.
Line 60, "outputing" should read --outputting--.

Signed and Sealed this

Eighth Day of April, 1997

Attest:

BRUCE LEHMAN

Attesting Officer

Commissioner of Patents and Trademarks